Patented June 27, 1944

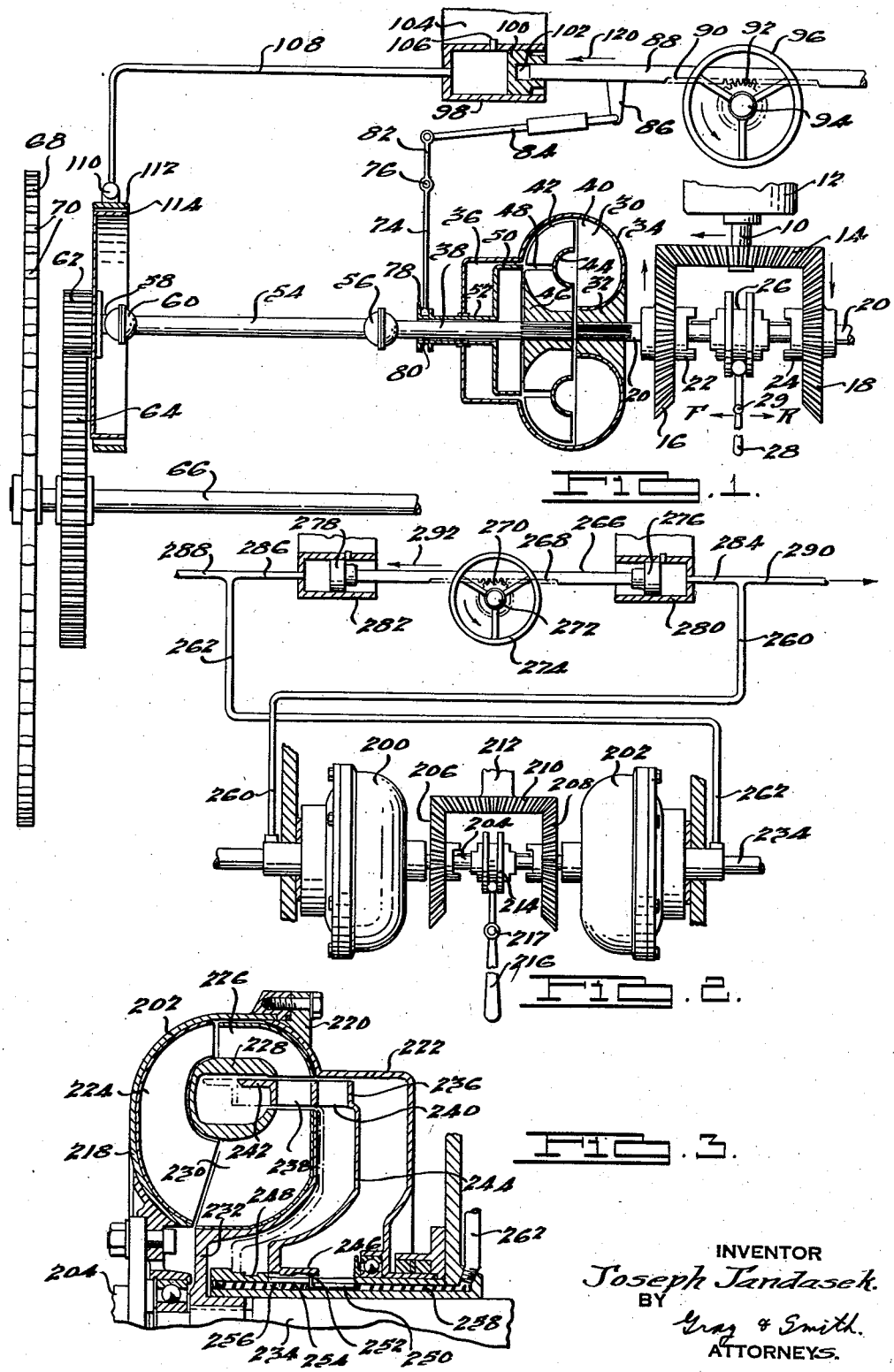

2,352,483

UNITED STATES PATENT OFFICE 2,352,483

TURBOTRANSMISSION

Joseph Jandasek, Detroit, Mich., assignor to Bendix Aviation Corporation, South Bend, Ind., a corporation of Delaware Application May 29, 1941, Serial No. 395,749

10 Claims. (Cl. 180—9.2)

This invention relates to power transmitting devices and more particularly to turbomechanisms adapted to divide power delivered from a single shaft and transmit it to drive a plurality of spaced shafts to exert unequal driving forces on said shafts.

In the operation of certain types of vehicles it is desirable that means be provided to permit varying the torque transmitted to the road engaging members on opposite sides of the vehicle. This unequal distribution of driving torque may be employed in vehicles such as track laying tractors to steer the vehicle, and may be employed in commercial vehicles to exert greater driving force on a ground engaging member having a firm foundation and to decrease the torque exerted on a ground engaging member so positioned as to have less traction.

An object of this invention is therefore to provide power transmitting means for dividing the power from an engine to exert increased driving forces on opposite sides of a vehicle.

A further object of the invention resides in the provision of spaced fluid actuated turbopower transmitting devices operably connected to drive spaced road engaging members of a vehicle and wherein manually operable means are provided to decrease the efficiency of power transmission on one side of the vehicle or to increase the torque transmitted by the unit on the other side of the vehicle to exert a steering force to turn the vehicle.

A further object is to provide successively actuated means for progressively decreasing the torque developed by a turbounit on one side of a vehicle and thereafter applying a brake on the same side of the vehicle to exert a force to steer the vehicle.

Another object is to provide a pair of spaced fluid actuated turboclutches driven by centrally disposed forward and reverse gearing to exert steering forces on opposite sides of a vehicle, and wherein manually operable means are provided to progressively decrease the efficiency of power transmission of one of the turboclutches thereby automatically increasing the efficiency of power transmission of the turboclutch on the other side to exert a steering force on the vehicle.

Yet another object is to provide manually operable valve means for progressively throttling a power transmitting fluid circuit of a turbounit to decrease the efficiency of one of a pair of spaced power transmitting units and thereafter apply a braking force to exert a steering force on the vehicle.

Yet a still further object resides in the provision of manually operable means to increase the torque multiplication of a torque converter and to exert a braking force on the opposite side of a vehicle to steer the vehicle.

Another object is to provide a pair of spaced torque converters driven by centrally disposed forward and reverse gearing wherein control means are provided to increase the torque multiplication of one of the torque converters and thereafter to exert a braking force on the road engaging elements on the opposite side of the vehicle, thereby decreasing the torque transmitted by its associated torque converter to automatically still further increase the power transmitted by the first mentioned torque converter to steer a vehicle.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a diagrammatic plan view of a portion of a power transmitting mechanism embodying the present invention.

Fig. 2 is a diagrammatic plan view of a modified form of the invention.

Fig. 3 is a longitudinal sectional view of the torque converters utilized in connection with the embodiment of the invention illustrated in Fig. 2.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to the embodiment of the invention illustrated in Fig. 1, it will be observed that a power shaft 10 projects from a mechanical gear transmission housed within a case 12 and is provided with a bevel gear 14. The bevel gear 14 meshes with and drives spaced bevel gears 16 and 18 concentrically mounted on a driving shaft 20. The gears 16 and 18 are provided with jaws 22 and 24 respectively adapted to receive oppositely disposed jaws carried by a sliding member 26 splined to the driving shaft 20. A manually operable lever 28 pivoted as at 29 may be provided to shift the sliding member 26 into engagement with the jaws 22 carried by the gear 16 to effect forward drive of the vehicle, and to shift the jaws carried by the sliding member 26 into engagement with the jaws 24 of the gear 18 to drive the shaft 20 in the reverse direction.

The driving shaft 20 is provided with spaced fluid energizing impellers 30 comprising hubs 32 splined to the shaft 20 and having housings 34 carried by each of the hubs 32. Each of the housings 34 is provided with an axially extending portion 36 concentrically mounted relative to a driven shaft 38. The housing 34 is provided with a plurality of fluid energizing blades 40 adapted to impart energy to a fluid circulating within the housing 34.

An energy absorbing turbine comprising a plurality of spaced turbine vanes 42 carried by a shroud 44 and a hub 46 is splined or otherwise securely fastened to the driven shaft 38. The vanes 42 are provided with an axially extending slot 48 to receive an axially movable shutter 50 carried by a sleeve 52 concentrically mounted between the driven shaft 38 and the housing 36 of the impeller members.

Each of the driven shafts 38 is operably connected to a jack shaft 54 through suitable universal joints 56. Each of the jack shafts 54 is operably connected with stub shafts 58 through suitable universal joints 60. The stub shafts 58 are provided with pinions 62 meshing with gears 64 fixed to an axle 66 provided with sprocket wheels 68. The sprocket wheel 68 may be provided with a plurality of spaced teeth 70 adapted to receive and drive endless chains or ground engaging tracks whereby the vehicle may be propelled.

Means may be provided to shift the sleeve 52 axially on the driven shaft 38 to introduce the shutter 50 into the slot 48 of the turbine vanes 42 thereby progressively throttling the power transmitting fluid circuit of the unit to decrease the power transmitted thereby.

One desirable form of means for throttling the power transmitting fluid circuit comprises a lever 74 fulcrumed at 76 and having a ball 78 engaging within a slot 80 of the sleeve 52. The upper end 82 of the lever 74 is pivotally connected through a link 84 and an arm 86 with a rod 88 movable laterally in the vehicle. The rod 88 is provided with a rack 90 adapted to be engaged by a pinion 92 carried by a shaft 94 having a steering wheel 96. Upon rotation of the steering wheel 96 the rod 88 moves laterally to actuate the shutter 50 relative to the power transmitting fluid circuit.

Liquid pressure inducing means such, for example, as a cylinder 98 having a piston 100 slidably mounted therein is positioned to be actuated by each end of the rod 88 after a substantially predetermined travel of the rod 88 in a clearance space 102 between the end of the rod 88 and the piston 100. A liquid reservoir 104 communicates with the cylinder 98 through a port 106 to compensate variation of volume of liquid within the system due to variation of temperature. The cylinder 98 is connected through a conduit 108 with a brake cylinder 110 operably connected to urge a brake band 112 into engagement with a brake drum 114 carried by the stub shaft 58.

The operation of this device when the invention is applied to a track lying tractor such, for example, as an armored tank, is as follows: When it is desired to drive the vehicle in the forward direction the lever 28 is actuated to interconnect the driving shaft 10 with the driving shaft 20 through the gears 14 and 16. The turboclutches 30 operably connected to each end of the driving shaft 20 operate to transmit substantially equal power to each side of the vehicle whereby the vehicle is driven in the forward direction. Referring more specifically to the drawing, it will be observed that the impeller blades 40 energize the liquid received from the turbines and direct it into engagement with the turbine vanes 42 operably connected through the turbine hubs 46 with the oppositely directed driven shafts 48.

When it is desired to exert a steering force on the vehicle such, for example, as to turn the vehicle to the left, the steering wheel 96 is rotated whereupon the pinion gear 92 engaging the rack 90 moves the rod 88 in the direction of the arrow 120. Movement of the rod 88 is transmitted through the arm 86, link 84 and upper portion 82 of the lever 74 to move the sleeve 52 axially relative to the driven shaft 38 to introduce the shutter 50 into the slot 48 to progressively throttle the power transmitting fluid circuit thereby decreasing the efficiency and quantity of power transmitted by the turboclutch on the left side of the vehicle. As the power transmitted by the turbounit on the left side of the vehicle is decreased, the power transmitted by the turbounit on the right side of the vehicle is proportionately increased whereupon a steering force is exerted on the vehicle.

If a sharper turn to the left is desired than is effected by varying the quantity of power transmitted by the turbounits on opposite sides of the vehicle, the steering wheel 96 may be rotated further in the counterclockwise direction whereupon the piston 100 closes the port 106 and exerts liquid pressure within the cylinder 98. This pressure is transmitted through the conduit 108 to actuate the cylinder 110 to apply the brake band 112 to the drum 114 to slow down or lock the left side of the vehicle. Greater power is then transmitted through the turbounit on the right side of the vehicle whereupon steering forces will be exerted to turn the vehicle sharply to the left. To effect a turn to the right the operation is reversed.

Figs. 2 and 3 disclose a modified form of the invention wherein torque converters 200 and 202 are driven by a driving shaft 204 operably connected through gears 206 and 208 with a gear 210 carried by a driving shaft 212 to effect forward and reverse drive respectively. A shifting member 214 axially movable on the shaft 204 and actuated by a lever 216 fulcrumed as at 217 may be provided to interconnect the forward and reverse gears 206 and 208 respectively with the driving shaft 204.

Referring now more particularly to Fig. 3, attention is called to the fact that the torque converters 200 or 202 include impeller housings 218 having suitable cover plates 200 provided with axially extending housing portions 222. Each of the impeller housings 218 is provided with a plurality of spaced impeller blades 224 adapted to energize liquid and direct it to suitable first stage turbine vanes 226 carried by a turbine shroud member 228 operably connected through second stage turbine vanes 230 with a turbine hub 232 fixed to a turbine driven shaft 234.

Interposed between the first and second stage turbine vanes 226 and 230 is an axially movable guide wheel member 236 having a plurality of spaced vaned channel portions 238 and 240 and a shutter 242 adapted to be selectively introduced into the power transmitting fluid circuit between the first stage turbine vanes 226 and the second stage turbine vanes 230. The guide wheel member 236 is carried by a radially extending flange 244 having a helically threaded hub portion 246 axially shiftable on a stationary member 248 having external helical threads to receive the internal helical threads formed in the hub 246.

During the normal operation of the device the guide wheel channel 238 is positioned in the power transmitting fluid circuit. The channel 240 is provided with suitable guide vanes which, when introduced into the power transmitting fluid circuit, increase the torque transmitted by the device. The shutter 242 when introduced into the power transmitting fluid circuit throttles the circuit and interrupts the transmission of power by the device.

Means may be provided to control the position of the guide wheel relative to the power transmitting fluid circuit. One desirable form of such control means comprises a plurality of spaced pistons 250 having fingers 252 engaging the guide wheel hub 246. The pistons 250 are slidably mounted in cylinders 254 and are maintained in a substantially predetermined normal position by springs 256 and 258 calibrated to exert forces to maintain the guide wheel in the position illustrated. The cylinders 254 may be subjected to liquid pressure through conduits 260 and 262 respectively.

Means may be provided to subject the conduits 260 and 262 to varying degrees of positive and negative pressure to vary the position of the guide wheels 236 relative to the power transmitting fluid circuit to vary the power transmitted by the turbounits 200 and 202 to exert steering forces on the vehicle.

One illustrative form of such means comprises a rod 266 laterally movable in the vehicle and provided with a rack 268 positioned to be engaged by a pinion 270 carried by a shaft 272 controlled by a steering wheel 274 to move the rod 266 in opposite directions. Each end of the rod 266 is provided with a piston 276 and 278 slidably mounted in cylinders 280 and 282 respectively to exert pressure in conduits 284 and 286 respectively communicating with the conduits 260 and 262 respectively. The conduit 286 also communicates with a conduit 288 and the conduit 284 communicates with a conduit 290. The conduits 288 and 290 are operably connected to brake mechanisms associated with the left and right hand sides of the vehicle respectively.

In the operation of this device when it is desired to exert a force to steer the vehicle to the left the steering wheel 274 is rotated in the counterclockwise direction whereupon the rod 266 is moved laterally in the direction of the arrow 292. The piston 278 moves laterally in the cylinder 282 and exerts positive pressure in the conduit 286. This pressure is transmitted through the conduit 262 to the cylinders 254 to actuate the pistons 250 to urge the guide wheel hub 246 axially to introduce the guide wheel channel 240 into the power transmitting fluid circuit of the turbounit 202 thereby increasing the torque multiplication of the device and exerting greater driving force on the road engaging members positioned on the right side of the vehicle.

Movement of the rod 266 in the direction of the arrow 292 by manipulation of the steering wheel 274 moves the piston 276 in the cylinder 280 to exert negative pressure therein. This negative pressure is transmitted through the conduit 260 to exert a sucking force in the cylinder 254 of the turbounit 200 to urge the piston 250 outwardly in the cylinder 254 thereby exerting a force to shift the guide wheel 236 axially to introduce the shutter 242 into the power transmitting fluid circuit and decrease the power transmitted by the torque converter 200 to drive the left side of the vehicle.

If a desired degree of turn is not effected by increasing and decreasing the power on opposite sides of the vehicle, further movement of the steering wheel 274 moves the rod 266 in the direction of the arrow 292 whereupon pressure is developed in the conduits 286 and 288. When the conduit 288 is subjected to a substantially predetermined pressure a brake mechanism associated with the road engaging members on the left side of the vehicle are slowed down or locked whereupon the increased power exerted on the right side of the vehicle cooperates with the retarded driving means on the left side of the vehicle to produce a force to turn the vehicle rapidly to the left. To effect a turn to the right the operation is reversed.

One form of fluid transmission embodied herein is disclosed in my co-pending application Serial No. 366,948, filed November 25, 1940.

I claim:

1. In a track laying tractor, means including axles to drive the tractor, brakes associated with the axles, a driving shaft, a pair of driven shafts interposed between the driving shaft and said axles, fluid power transmitting means interposed between the driving shaft and each of the driven shafts and comprising fluid energizing impellers and energy absorbing turbines cooperating with the impellers to form power transmitting fluid circuits, means movable relative to the power transmitting fluid circuits to vary the power transmitted from the driving shaft to each of the driven shafts, manually operable means controlling said last named means, and means operable after a predetermined movement of said manually operable means to actuate the brakes associated with one of the spaced axles.

2. In a power transmitting device, a driving shaft, a pair of spaced torque converters having impellers operably connected to the driving shaft, a pair of spaced driven shafts, connecting means between the impellers and the driven shafts comprising energy absorbing turbine members cooperating with the impellers to form power transmitting fluid circuits, a guide wheel having a plurality of spaced channel portions adapted to be selectively introduced into the power transmitting fluid circuit to vary the torque transmitting characteristics of each of the torque converters, fluid pressure responsive means controlling the position of the guide wheel members relative to the power transmitting fluid circuits, and manually operable means for actuating the fluid pressure responsive means to shift the guide wheel members of the spaced torque converters to automatically increase the torque transmitting characteristics of one of the torque converters and to decrease the power transmitted by the other of the spaced torque converters.

3. A power transmitting device comprising a driving shaft, a pair of spaced driven shafts aligned with the driving shaft, fluid power transmitting means between the driving shaft and each of the driven shafts comprising spaced torque converters having cooperating impeller and turbine members carried by the driving and driven shafts respectively and cooperating to form spaced power transmitting fluid circuits, guide wheel means having a plurality of spaced channel portions and a restricting baffle adapted to be selectively introduced into the power transmitting fluid circuit of each of the torque converters, fluid pressure responsive means controlling the position of each of the guide wheel members, manually operable means controlling the fluid pressure responsive means whereby the power transmitted by one of the torque converters may be increased accompanied by an automatic decrease in the power transmitted by the other torque converter to exert varying degrees of power on each of the driven shafts.

4. In a power transmitting device for a motor vehicle having spaced rotatable members, a driving shaft, spaced turbotorque converters having rotatable fluid energizing impellers operably connected to the driving shaft, a pair of spaced driven shafts, rotatable energy absorbing turbine members operably connected to the driven shafts and cooperating with the impellers to form power transmitting fluid circuits, guide wheel means having a plurality of spaced channel portions adapted to be selectively introduced into the power transmitting fluid circuit of each of the torque converters to vary their torque transmitting characteristics, brakes for the rotatable members, means controlling the guide wheel means and brakes to successively vary the torque transmitted to each of the spaced driven shafts and thereafter to apply the brakes to the rotatable member receiving the least power.

5. In a power transmitting device for a motor vehicle having rotatable members equipped with brakes comprising a driving shaft, a pair of spaced turboclutches operably connected to the driving shaft and comprising impeller and turbine members cooperating to form power transmitting fluid circuits, driven shafts aligned with the driving shaft, connecting means between the driven shafts and turbine members, axially movable baffle means carried by the driven shafts and movable into the power transmitting fluid circuits, means controlling the baffle members and brakes comprising a laterally movable rod, a linkage interconnecting the laterally movable rod and the axially movable baffle members, and liquid actuated motion transmitting means between the laterally movable rod and the brakes whereby the power transmitting fluid circuit of one of the turbo clutches may be restricted to decrease the power transmitted to its associated driven shaft and thereafter the brakes may be actuated to stop the rotatable member on one side of the vehicle and the power transmitted to the other driven shaft can be automatically increased.

6. In a power transmitting device for a motor vehicle having rotatable members, brakes for the rotatable members, a driving shaft, forward and reverse gearing associated with the driving shaft, manually operable means controlling said forward and reverse gearing, fluid power actuated power transmitting means carried by the driving shaft and comprising impellers having fluid energizing vanes, turbine members having energy absorbing vanes, cooperating with the impeller to form power transmitting circuits, a pair of spaced driven shafts, connecting means between the turbine vanes and the driven shafts, means movable relative to the power transmitting fluid circuits to vary the power transmitted through each of the spaced turbounits, motion transmitting means controlling the means movable relative to the fluid circuits and the brakes, and manually operable means controlling the motion transmitting means to successively actuate the means movable relative to one of said fluid circuits and to thereafter apply the brakes to one of the rotatable members.

7. In a track laying tractor, a pair of spaced rotatable members, means including axles to drive said rotatable members, brakes associated with the axles, a driving shaft, a pair of driven shafts interposed between the driving shaft and said axles, fluid clutches interposed between the driving shaft and each of the driven shafts and comprising fluid energizing impellers and energy absorbing turbines cooperating with the impellers to form power transmitting fluid circuits, baffle means movable relative to the power transmitting fluid circuits to vary the power transmitted from the driving shaft to each of the driven shafts, manually operable means controlling said last named means, and means operable after a predetermined movement of said manually operable means to actuate the brakes associated with the axle receiving the least amount of power to exert a force to steer the track laying tractor.

8. A power transmitting device for a motor vehicle having rotatable members comprising a driving shaft, spaced turboclutches having rotatable fluid energizing impellers driven by the driving shaft, a pair of spaced driven shafts, rotatable energy absorbing turbine members carried by the driven shafts and cooperating with the impellers to form spaced power transmitting fluid circuits, baffle means to restrict the power transmitting fluid circuits of each of the turboclutches, brakes associated with said rotatable members, manually operable means for successively controlling the baffle means to restrict the power transmitting fluid circuit of one of the spaced turboclutches to vary the proportion of power transmitted to each of the spaced driven shafts and thereafter to apply the brakes.

9. A power transmitting device comprising a driving shaft, a pair of spaced torque converters operably connected to the driving shaft and comprising rotatable impeller and turbine members cooperating to form power transmitting fluid circuits, driven shafts aligned with the driving shaft, connecting means between the driven shafts and turbine members, axially movable guide wheel means having spaced fluid directing channels carried by the driven shafts and movable relative to the power transmitting fluid circuits to vary the torque multiplication of the torque converters, fluid pressure actuated means controlling the guide wheel means, means for actuating the fluid pressure actuated means comprising a laterally movable rod and pressure inducing means carried by the rod whereby the guide wheel means may be shifted axially relative to the power transmitting fluid circuits to vary the torque transmitted to the driven shafts.

10. In a track laying tractor, a pair of spaced rotatable members, means including axles to drive said tracks, brakes associated with the axles, a driving shaft, a pair of driven shafts interposed between the driving shaft and said axles, torque converters interposed between the driving shaft and each of the driven shafts and comprising fluid energizing impellers and energy absorbing turbines cooperating with the impellers to form power transmitting fluid circuits, guide wheel means having a plurality of spaced channels adapted to be selectively interposed in the power transmitting fluid circuits to vary the power transmitted from the driving shaft to each of the driven shafts, fluid pressure responsive means controlling the guide wheel means, and means to successively actuate the guide wheel means to increase torque multiplication in one of the torque converters and to thereafter apply the brakes associated with the other torque converter.

JOSEPH JANDASEK.